LE ROY W. SLY AND R. L. OLIVER
SAW TOOTH.
APPLICATION FILED DEC. 14, 1917.

1,326,797.

Patented Dec. 30, 1919.

Inventor
Leroy W. Sly &
Robert L. Oliver

Witnesses

By Victor J. Evans
Attorney

UNITED STATES PATENT OFFICE.

LE ROY W. SLY AND ROBERT L. OLIVER, OF DORRIS, CALIFORNIA.

SAW-TOOTH.

1,326,797. Specification of Letters Patent. Patented Dec. 30, 1919.

Application filed December 14, 1917. Serial No. 207,164.

*To all whom it may concern:*

Be it known that we, LE ROY W. SLY and ROBERT L. OLIVER, citizens of the United States, residing at Dorris, in the county of Siskiyou and State of California, have invented new and useful Improvements in Saw-Teeth, of which the following is a specification.

This invention relates to that class of saws which obviate the use of extraneous means for securing the teeth in the saw, and wherein provision is made of a novel construction of tooth designed to interlock with the walls of the saw recesses for effectively retaining the teeth therein.

With the above and other objects in view, the invention consists in the novel features, details of construction and combination of parts which will hereinafter be more fully set forth, illustrated in the accompanying drawing and pointed out in the appended claims.

Figure 1:
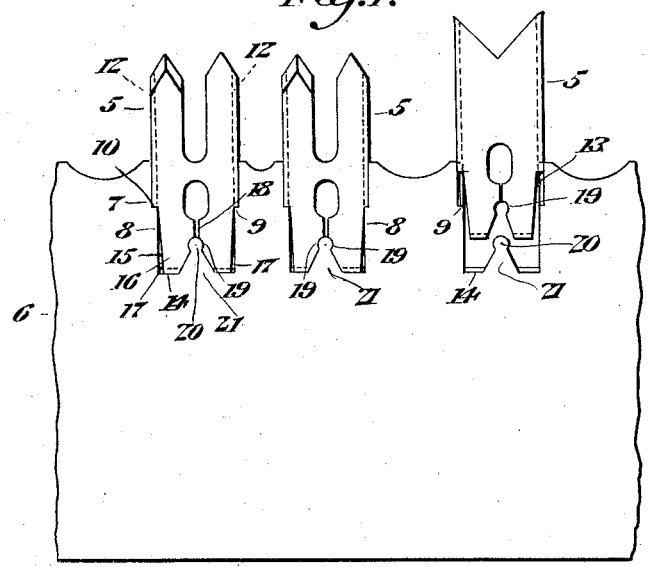
Figure 1 is a side elevation of a saw illustrating a plurality of drag or cross-cut saw teeth associated therewith.
Figure 2:
Fig. 2 is an edge view of the saw.
Figure 3:
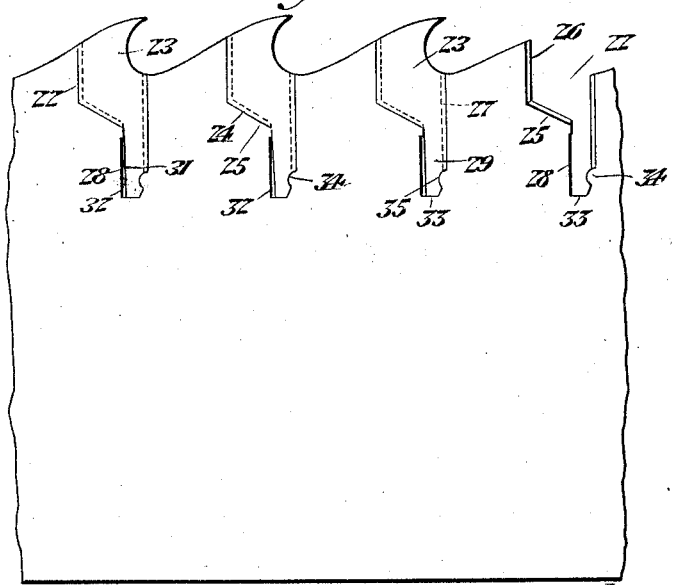
Fig. 3 is a view similar to Fig. 1 showing a slight modified form of saw tooth.
Figure 4:
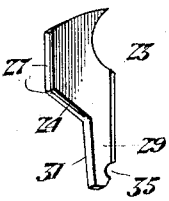
Fig. 4 is a detail view illustrating the tooth removed from the recess.

Reference being had more particularly to Figs. 1 and 2, the insertible saw tooth designated by the character 5 is designed for use in drag or cross-cut saws, the blade of which is denoted by the character 6, and this blade is provided in its edge with a plurality of spaced recesses 7, and the side walls 8 of said recesses are provided at a point intermediate the length of the recess with oppositely arranged horizontally disposed shoulders 9 which act as abutments for the shoulders 10 of the teeth, upon the insertion of the latter in said recesses. The outer longitudinal edges of the teeth are provided with substantially V-shaped grooves 12 that terminate at the shoulders 10. Upon the insertion of the teeth in said recesses the grooves 12 receive the tongues 13 on the confronting faces of the spaced side walls. The shanks 16 of the teeth are tapered as indicated by 15. From this it follows that, substantially V-shaped spaces 17 are provided, which upon the insertion of an instrument in the throat or slot 18, will permit of the shank being expanded to release its tooth. The shank is provided with a substantially semi-circular notch 19 which co-acts or interlocks with the rounded head 20 of the projection 21, as the teeth are inserted home into the recesses. This projection is provided on the closed bottom wall 14 of the recess.

In the form of tooth illustrated in the remaining figures of the drawing, the blade of the saw is provided in its edge with a plurality of recesses 22 in which the saw teeth 23, especially designed for band, circular or gang saws, are inserted, the abutments 24 of the teeth engaging with the shoulders 25 of the recesses for limiting the insertion of the teeth within said recesses. The confronting side walls forming the recesses 22, are provided with tongues 26 which interlock in the V-shaped grooves 27 of the saw teeth. The tongue on one of the side walls of each recess terminates at the inner end of the shoulders 25. The inner portion of each recess is reduced in width, and between one wall 28 of said inner portion and the taper edge 31 of the tooth shank is afforded an inverted V-shaped space 32. The inner end of the recess is closed as indicated by 33. At 34 is a projection 34 which interlocks in the notch 35 formed in the tooth shank, and establishes an interlocking engagement of the tooth with the blade. The provision of the V-shaped recesses 32, as well as the V-shaped recesses 17 of the preferred embodiment of the invention, will permit the shanks of the teeth to be expanded laterally to remove the teeth from an interlocking engagement with the blade.

It will be manifest from the foregoing that in each of the embodiments of my invention the space afforded at the opposite side of a shank portion with reference to a rounded projection on the blade permits of the tooth being readily sprung into and out of engagement with the body.

From the foregoing description, taken in connection with the accompanying drawing, the advantages of construction and the method of operation will be readily apparent to those skilled in the art to which the invention relates, and while we have described the principles of operation of the invention, together with the devices which we now consider to be the best embodiments thereof, we desire to have it understood that the devices shown are merely illustrative and that such changes may be made when desired as are within the scope of the appended claims.

What is claimed as new, is:—

1. The combination of a saw blade having a recess in its edge, the inner portion of which recess is reduced in width, and also having means on opposite walls of the recess to prevent displacement of a tooth at right angles to the greatest width thereof and further having a rounded projection on one wall of the inner portion of the recess and spaced from one side wall thereof, and a tooth having means to coöperate with said means of the blade in preventing lateral displacement of the tooth and also having a reduced inner portion in one edge of which is a rounded recess to receive said projection and the opposite edge of which is tapered toward the inner end of the shank to afford a play space between said edge and the opposed recess wall.

2. The combination of a saw blade having a recess in its edge, the inner portion of which recess is reduced in width, and also having means on opposite walls of the recess to prevent displacement of a tooth at right angles to the greatest width thereof and further having a rounded projection on a portion that is tapered and extends outwardly from the center of the inner wall of the recess, and a tooth having means to coöperate with said means of the blade in preventing lateral displacement of the tooth and also having a reduced inner portion the side edges of which are tapered toward the inner end of the shank to afford play spaces, said shank being bifurcated and having a rounded recess and divergent walls reaching from said recess to the end of the shank.

In testimony whereof we affix our signatures.

LE ROY W. SLY.
ROBERT L. OLIVER.